United States Patent [19]

Okumura et al.

[11] Patent Number: 5,173,592
[45] Date of Patent: Dec. 22, 1992

[54] METHOD AND APPARATUS FOR MULTI-LAYER WELDING

[75] Inventors: Shinji Okumura; Keiichi Takaoka; Tatsumi Nakazato, all of Kitakyushu, Japan

[73] Assignee: Kabushiki Kaisha Yaskawa Denki Seisakusho, Fukuoka, Japan

[21] Appl. No.: 598,704

[22] PCT Filed: Feb. 21, 1990

[86] PCT No.: PCT/JP90/00212
§ 371 Date: Oct. 17, 1990
§ 102(e) Date: Oct. 17, 1990

[87] PCT Pub. No.: WO90/09859
PCT Pub. Date: Sep. 7, 1990

[30] Foreign Application Priority Data

Feb. 23, 1989 [JP] Japan ................... 10-43900
Feb. 23, 1989 [JP] Japan ................... 1-43901
Mar. 10, 1989 [JP] Japan ................... 1-58888

[51] Int. Cl.$^5$ .............................. B23K 9/12
[52] U.S. Cl. ..................... 219/125.1; 901/42
[58] Field of Search ........... 219/124.34, 125.1, 125.11; 901/42, 18

[56] References Cited

U.S. PATENT DOCUMENTS 4,508,953 4/1985 Murakami et al. ............ 219/125.1
4,979,127 12/1990 Mizuno et al. ................. 901/18

Primary Examiner—Clifford C. Shaw
Attorney, Agent, or Firm—Jordan and Hamburg

[57] ABSTRACT

Approximate straight lines or approximate curves at the instructed points are obtained on the basis of coordinates actually passed by a welding torch at the instructed points in the welding of the first layer, points on the approximate straight lines or approximate curves are calculated on the basis of distance at the instructed points, and actual welding path is defined at the points. In the locus of the second and succeeding layers, a shift direction and a shift amount are obtained by calculation on the basis of two points instructed as a welding start point and a termination point in the teaching of the first layer and two reference points designated to define the shift direction, and the locus of operation after the second layer is calculated to effect multi-layer welding. For controlling the torch attitude in the welding of the second layer and succeeding layers, a locus of operation of a torch in the welding of the first layer and a locus of operation of the second and succeeding layers are obtained on the basis of a torch rotational angle given from the outside, after which the torch is rotated by a portion of a torch rotational angle about the traveling vector obtained at the instructed point, and the attitude data is obtained by calculation. Welding of the second and succeeding layers is carried out on the basis of the obtained attitude data.

2 Claims, 11 Drawing Sheets

- • TEACHING POINT
- × PASSAGE POINT
- •——• TEACHING PATH
- ×------× ACTUAL WELDING PATH OBTAINED BY CONVENTIONAL METHOD
- ▲——▲ ACTUAL WELDING PATH OBTAINED BY THE PRESENT METHOD

FIG. 5

OBTAIN MIDDLE POINT OF A COMMON
PERPENDICULAR LINE OF TWO
STRAIGHT LINES ON SPACE

↓

MIDDLE POINTS $(P_x, P_y, P_z)$ OF $\begin{cases} \text{STRAIGHT LINE } L_1(x_1, y_1, z_1, \ell_1, m_1, n_1) \\ \text{STRAIGHT LINE } L_2(x_2, y_2, z_2, \ell_2, m_2, n_2) \end{cases}$ ARE:

$\cos\theta = \ell_1\ell_2 + m_1m_2 + n_1n_2$, $\sin^2\theta = 1 - \cos^2\theta$
$DX = x_2 - x_1$, $DY = y_2 - y_1$, $DZ = z_2 - z_1$
$R_1 = \ell_1 DX + m_1 DY + n_1 DZ$
$R_2 = \ell_2 DX + m_2 DY + n_2 DZ$
$S = (R_1 - R_2\cos\theta) / \sin^2\theta$
$T = (R_1\cos\theta - R_2) / \sin^2\theta$ <u>$P_1$(POINT OF INTERSECTION BETWEEN STRAIGHT LINE $L_1$ AND COMMON PERPENDICULAR LINE)</u>
  $P_{1x} = x_1 + S \times \ell_1$
  $P_{1y} = y_1 + S \times m_1$
  $P_{1z} = z_1 + S \times n_1$ <u>$P_2$(POINT OF INTERSECTION BETWEEN STRAIGHT LINE $L_2$ AND COMMON PERPENDICULAR LINE)</u>
  $P_{2x} = x_2 + T \times \ell_2$
  $P_{2y} = y_2 + T \times m_2$
  $P_{2z} = z_2 + T \times n_2$ <u>POINT P</u>
  $P_x = (P_{1x} + P_{2x}) / 2$
  $P_y = (P_{1y} + P_{2y}) / 2$
  $P_z = (P_{1z} + P_{2z}) / 2$

↓

( RETURN )

$P_1, P_2$: TEACHING POINTS
$R_1, R_2$: REFERENCE POINTS
$P_1', P_2'$: RESULT OF SHIFT
A,B: SET VALUE OF SHIFT AMOUNT

METHOD AND APPARATUS FOR MULTI-LAYER WELDING

FIELD OF THE INVENTION

The present invention relates to a method and apparatus for multi-layer welding using a welding robot.

BACKGROUND OF THE INVENTION

Welding robots now come into wide use since they fulfill objectives such as labor saving, quality-enhancement or improvements in environmental conditions of welding work or the like, in place of conventional welding work relying upon experiences or intuition of an operator. Among welding operations performed by the welding robot, multi-layer welding is a very important operation for reasons such as securing a strength of a welded portion but robots have many technical difficulties.

Japanese Patent Application Laid-Open (Kokai) No. 58(1983)-188572 (corresponding to U.S. Pat. No. 4,508,953) discloses a multi-layer welding operation, generally, the first layer is welded according to the tracking function, and therefore, a deviation occurs between a teaching path and an actual welding path. Even if a teaching path is used as a reference path for determining paths for the second and succeeding layers, the tracking function is necessary for the second and succeeding layers similar to the first layer. However, in the second and succeeding layers, the first layer is already filled with a bead, and therefore, a current variation cannot be obtained. Accordingly, groove position information is not known.

For this reason, a method which uses no tracking function for the second and succeeding layers stores an actual welding path when the first layer is welded and determine paths for the second and succeeding layers on the basis of the stored path. In this method, there is a method for corresponding the locus when the first layer is welded to instructed points of the teaching path to store it as a point having passed during the actual welding and generating an actual welding path at the stored point, as proposed in the aforesaid Japanese Patent Application Laid-Open (Kokai) No. 58(1983)-188572.

However, when generally, the tracking function is used, a welding torch follows an actual welding line with unevenness under the tracking conditions, and therefore, in the aforesaid method, case where the actual welding path is defined merely on the basis of the point having passed during actual welding, that is, in the case where the instructed points are defined by two passed point, said unevenness becomes included in data of the passed points, and as a result, an error occurs between original welding lines.

More specifically, as shown in FIG. 1, an error occurs in the obtained actual welding path (indicated at the broken line between x and x) irrespective of the presence or absence of a positional deviation between the instructed path and the actual welding line (a curve indicated by the solid line). Accordingly, if the actual welding path is defined by the conventional method to determine paths of the second and succeeding layers using the actual welding path as a reference, an error in the first layer becomes included in the final layer.

As the way for obtaining an operational locus of the second and succeeding layers, Japanese Patent Application Laid-Open (Kokai) No. 58(1983)-187270 discloses a method for storing the operational locus of the first layer in a memory of a robot control device, providing a shift width $\Delta S$ as a parameter in an arithmetic processor of the robot control device to obtain the shift direction of the second and succeeding layers from the stored data of the first layer, and obtaining the operational locus of the second and succeeding layers from said shift width to carry out the multi-layer welding.

The aforesaid method is a method comprising teaching within an X-Y plane and having a restriction of setting of a shift amount which is accurate and only in one direction.

However, actually, in the welding operation by the robot, there are present three-dimensional errors due to reasons such as occurrences of an error in work setting, a thermal strain during welding, an error in temporary welding and the like, and therefore, the welding locus cannot be defined on the X-Y plane. Further, the shift direction of the multi-layer has to be considered in terms of the three dimension instead of the two-dimension.

From the foregoing, it is impossible to perform multi-layer welding by use of the aforesaid method.

Japanese Paten Application Laid-Open (Kokai) No. 57-50279 discloses a welding robot for calculating a position of the tip of a welding torch from a predetermined constant and variables so that the tip of a welding torch can be controlled to be moved along the desired locus, wherein the predetermined constant is sequentially changed by a preset amount, and the tip of a welding torch is moved by said preset amount from the desired locus to render multi-layer welding possible.

However, in this welding robot, a biaxial angle of a wrist portion of the robot is obtained from the shift amount to perform positional control, and therefore, the shift amount at the tip of a welding torch is limited by a mechanism of the robot. Accordingly, this welding robot is not for general purpose. Furthermore, since the wrist is constituted by two axes, the freedom in the attitude of the torch which is essential to welding is poor (the wrist needs to have at least three freedoms in order to increase the freedom).

Next, as a method for calculating the attitude of the torch of the second and succeeding layers, Japanese Patent Application Laid-Open (Kokai) No. 57-50279 discloses a method for multi-layer welding for calculating a position of the tip of a welding torch from a predetermined constant and variables so that the tip of a welding torch may be controlled to be moved along the desired locus, wherein the desired constant is sequentially changed by a preset amount, and the tip of the welding torch is moved by said preset amount from the desired locus to thereby render multi-layer welding possible.

However, it is sometimes requested in terms of execution of welding that the attitude of the torch 7 is changed sequentially in the second and third layers in an attitude different from that of the first layer as shown in FIG. 2. In such a case, in the aforesaid method for multi-layer welding, calculation will be made of the position alone, and the change of the attitude of the torch 7 is not taken into consideration. Therefore, in the case where the attitude of the torch 7 has to be changed, correction needs be made sequentially in the second and the third layers by teaching, taking considerable time.

SUMMARY OF THE INVENTION

It is an object of the present invention to provide a procedure for performing multi-layer welding with high accuracy.

More specifically, the first object of the present invention is to use a calculation for preparing a locus of the first layer to minimize the aforementioned error thus performing multi-layer welding with high accuracy.

It is a second object of the present invention to obtain a locus of the second and succeeding layers merely by operator's setting of the shift amount of the second and succeeding layers, whereby multi-layer welding can be performed very easily.

It is a third object of the present invention to automatically calculate the attitude of a torch of the second and succeeding layers to perform multi-layer welding.

For achieving the aforesaid first object, according to the first invention, multi-layer welding according to a path of welding defined by interpolating a plurality of instructed points by a suitable line is performed by storing N coordinates actually passed by a welding torch in the welding operation of the first layer at the instructed points, calculating and storing approximate straight lines and approximate curves using a method of least square at the instructed points on the basis of said stored N coordinates at the instructed points, and calculating points on each of the approximate straight lines or approximate curves on the basis of the distance of the instructed points to define each actual welding path by said points.

In the present invention, the actual welding line is calculated in the following procedure.

(1) N coordinates actually passed by a welding torch in the welding operation of the first layer at the instructed points are stored.

(2) Approximate straight lines are calculated and stored using a method of least squares on the basis of the N coordinates stored in (1) above.

(3) Points on each approximate straight lines are calculated on the basis of the distance of the instructed points, these points being points used to define each actual welding path.

In this manner, the welding path of the first layer as a reference of the actual welding path of the second and succeeding layers can be defined with high accuracy, and therefore, the lowering of the welding accuracy caused by accumulation of errors can be prevented.

For achieving the aforesaid second object, a method for multi-layer welding according to the second invention is characterized by obtaining two points instructed as a welding start point and a welding termination point in the teaching of the first layer, and two reference points and three direction cosines designated to define the shift direction, obtaining the horizontal shift amount, vertical shift amount and shift directions of each layer from the shift set amount and said direction cosines, and calculating the locus of the operation of the second and succeeding layers from the shift directions and the shift amount to perform multi-layer welding.

In this invention, by merely instructing the reference point in the first layer to set the shift amount of the second layer and succeeding layers, the thereafter multi-layer welding can be automated, and the operator's operation is extremely easy. Moreover, since the vertical shift is also taken into consideration, the three-dimensional shift can be easily attained.

For achieving the aforesaid third object, a method for multi-layer welding using a teach/playback type robot capable of calculating the shift according to the third invention is characterized by storing a locus of operation of a torch in the welding of the first layer in a position data memory of a robot control device, feeding a rotational angle of the torch as a parameter from outside to an attitude rotational angle memory of the robot control device, rotating the torch by a portion of the rotational angle of the torch about the traveling vector obtained at the instructed points after the locus of operation of the second and succeeding layers, and performing welding of the second and succeeding layers on the basis of the obtained attitude data.

In the present invention, the position data of the torch in the welding of the first layer is instructed, and the rotational angle of the torch of the second and succeeding layers is provided in advance as a parameter. The locus of operation in the welding of the first layer is obtained from the instructed data, and the locus of operation of the second and succeeding layers is obtained by feeding a predetermined shift to the locus of operation of the first layer. At this time, the torch is rotated by a portion of the rotational angle of the torch given as a parameter in advance, and welding is performed in a predetermined attitude of the torch.

BRIEF DESCRIPTION OF THE DRAWINGS

FIG. 5 is a flowchart showing processing in a joint between steps.

DETAILED DISCLOSURE OF THE INVENTION

The present invention will now be described in detail in conjunction with the illustrated embodiments.

Figure 3:
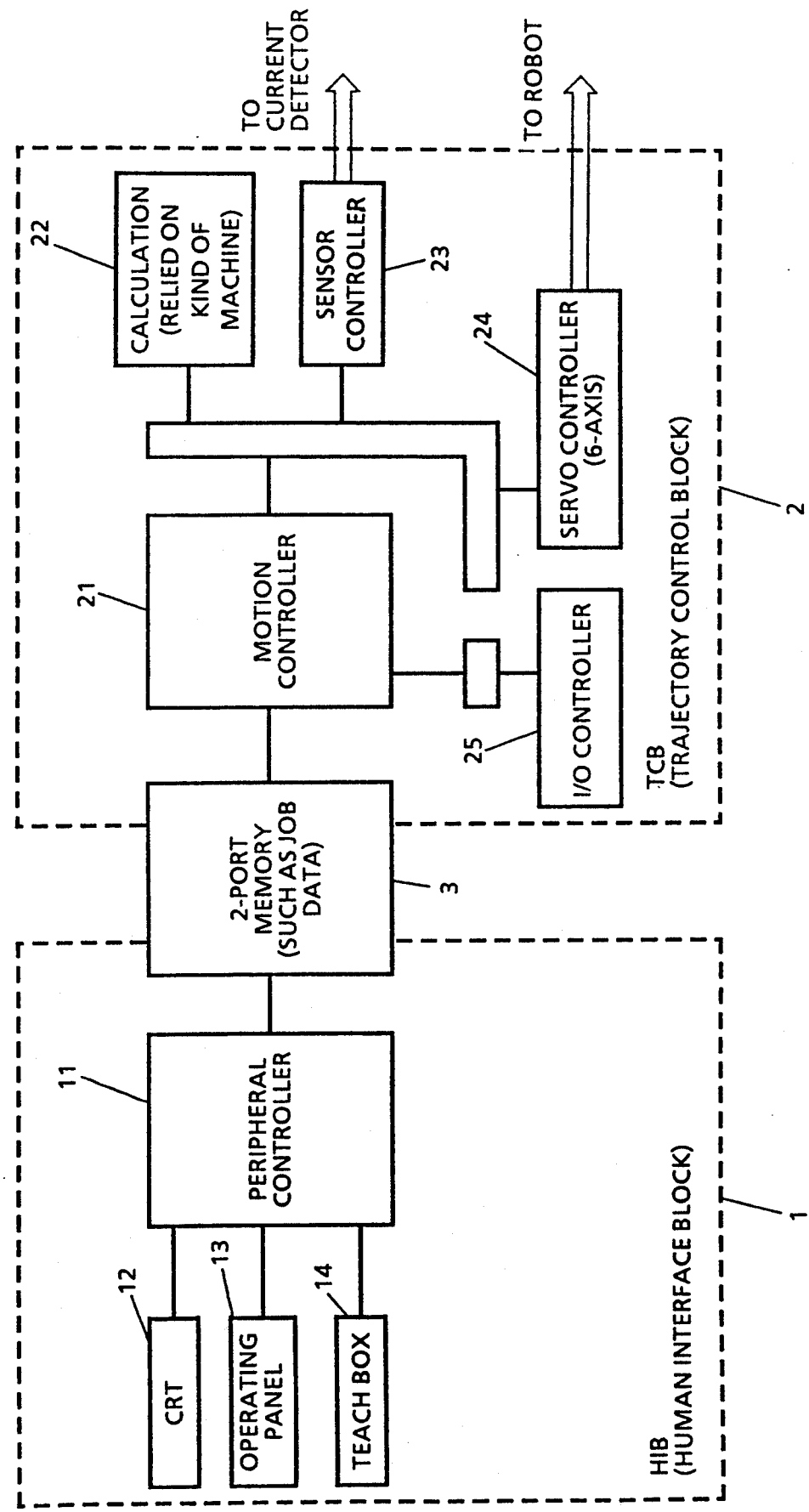
FIG. 3 is a block diagram showing a first embodiment of the invention.

FIG. 3 is a control block diagram showing an example of configuration of a multi-layer welding apparatus according to a first embodiment of the invention.

The whole apparatus is divided into a human interface block 1 and a trajectory control block 2, which are coupled together by a 2-port memory. The human interface block 1 has a CRT 12, an operating panel 13 and a teach box 14 connected thereto using a peripheral control section 11 as a control section.

The trajectory control block 12 has a calculating section 22, a sensor control section 23, a servocontrol section 24 and an I/O control section 25 connected thereto using a motion control section 21 as a control section.

Jobs registered from the teach box 14 or the operating panel 13 are stored in the 2-port memory 3, and when a start instruction is given to the robot, the designated job is read and executed by the motion control section 21.

The sensor control section 23 is processed in synthronism with the execution. N coordinates are stored therein (first means).

The calculation section 22 performs processing for calculating the coordinates of the robot and determining a welding line (second and third means).

Figure 4A:
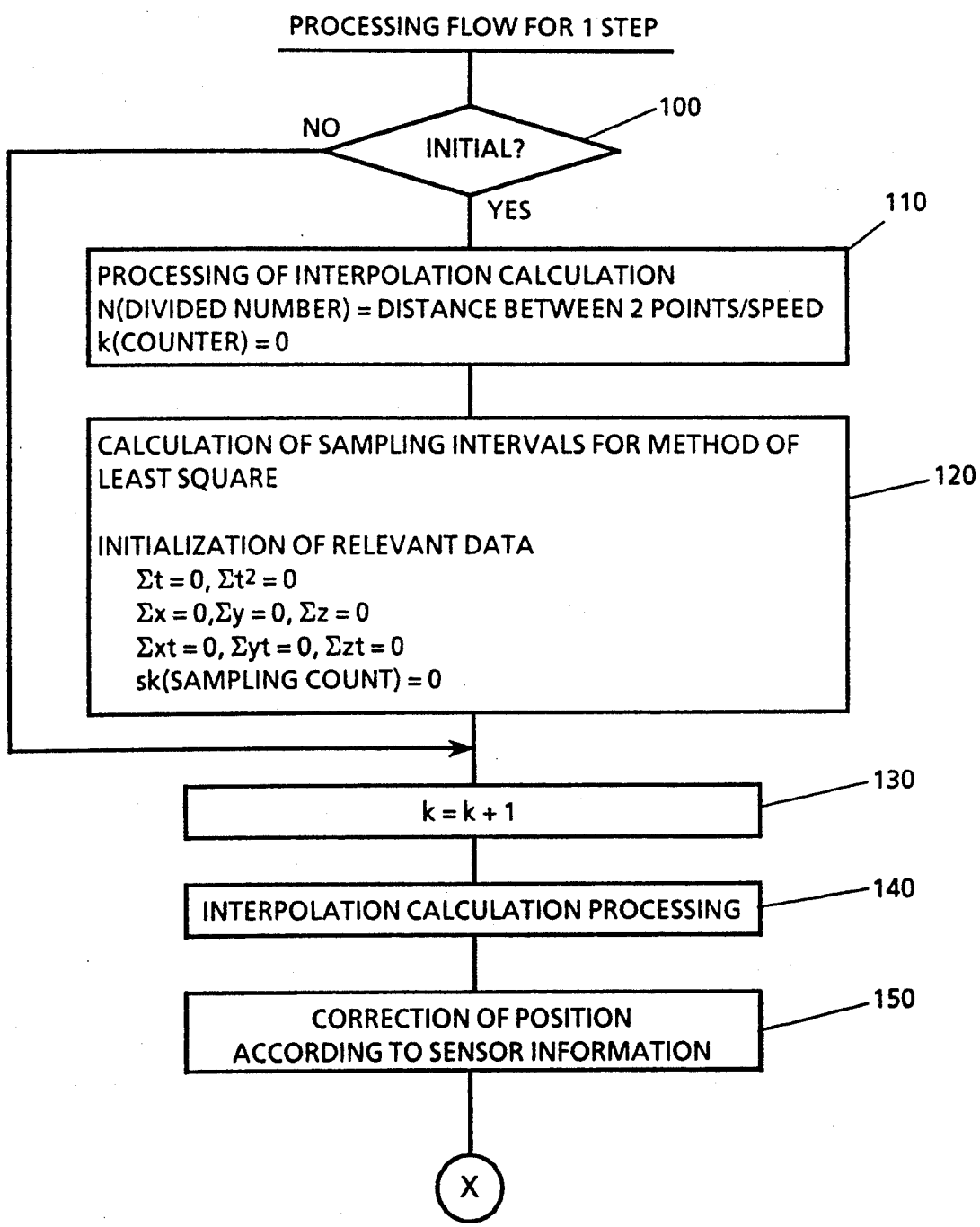
FIGS. 4A and 4B are flowcharts showing processing by a method of least squares of the invention.
Figure 4B:
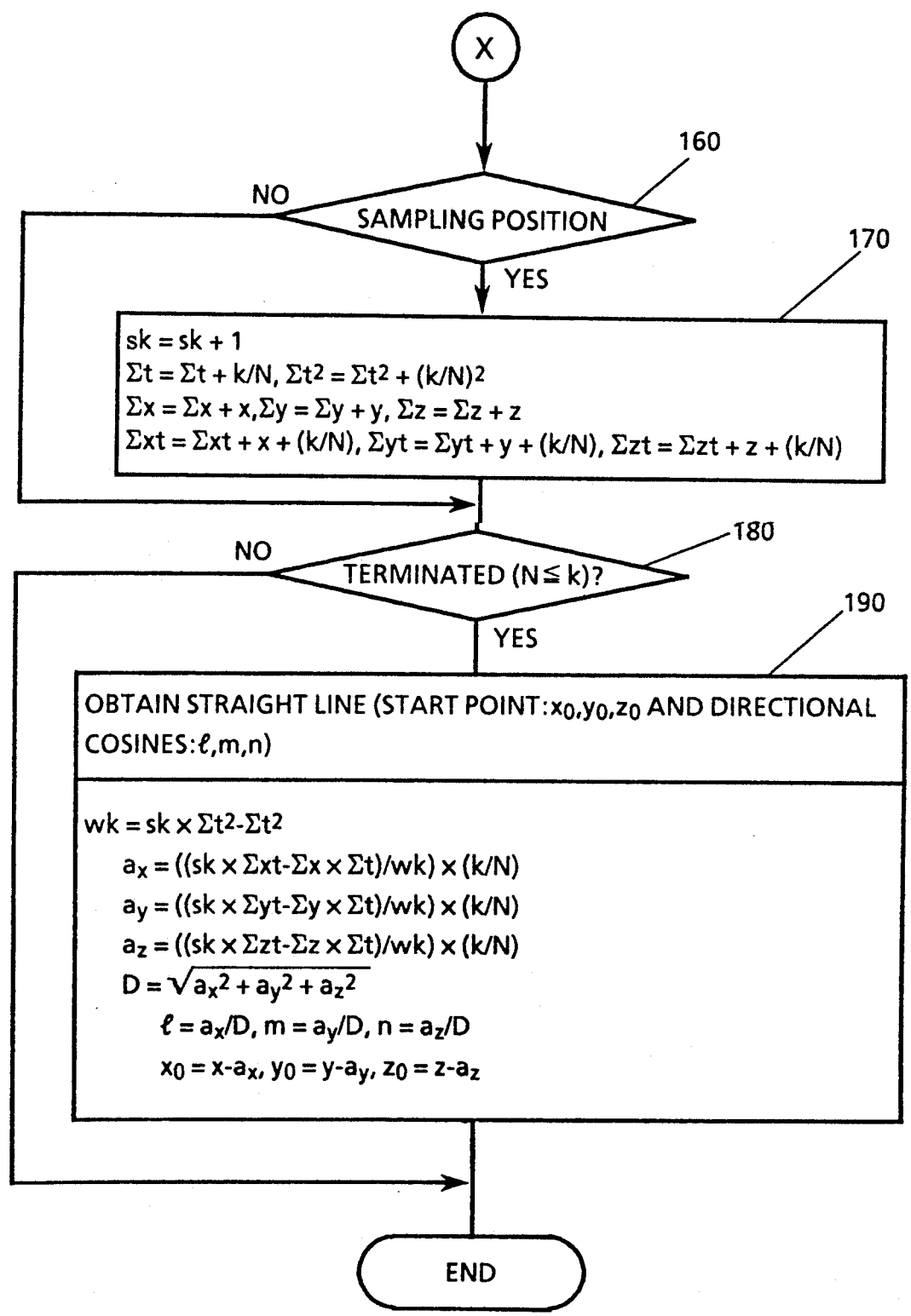

FIG. 4 shows a flowchart of a method of least squares used in the present invention. Processing between steps is performed every control clock.

Step 100: Initial

Here, judgment is made of if it is a start of initial movement at the instructed points.

Step 110: Preprocessing of calculation of interpolation

Here, the divided number N is obtained as the value obtained by dividing the distance between two points by speed, and the count number k of a counter is reset to 0.

Step 120: Calculation of sampling intervals for a method of least squares

Here, initialization of relevant data shown below is performed.

$\Sigma t = 0, \Sigma t^2 = 0$ $\Sigma x = 0, \Sigma y = 0, \Sigma z = 0$ $\Sigma xt = 0, \Sigma yt = 0, \Sigma zt = 0$ Sampling count number $sk = 0$ Step 130:

Here, "1" is added to the count number k to execute the thereafter processing.

Step 140:

Here, interpolation calculation processing is performed by use of a known procedure.

Step 150:

Here, fine corrected amounts $\Delta X$, $\Delta Y$ and $\Delta Z$ on a rectangular coordinate system are transmitted from a sensor, and control points are corrected thereby.

At that time, as present values, x, y and z are used.

Step 160: Sampling position

Here, two points are subjected to sampling at equi-intervals according to the number of samplings.

Step 170:

Here, calculation of preprocessing is performed prior to calculation (Step 190) by a method of least squares.

Sampling points may be successively stored in a memory and finally the calculation by a method of least square for all may be performed. However, this step is used to perform calculation in order to save the memory and calculation tine. That is, possible calculation is performed during sampling in order to prevent the calculation from concentration on a certain timing.

"1" is added to the count value sk of a sampling counter.

$\Sigma t = \Sigma t + k/N$, $\Sigma t^2 = \Sigma t^2 + (k/N)^2$ $\Sigma x = \Sigma x + x, \Sigma y = \Sigma y + y, \Sigma z = \Sigma z + z$, $\Sigma xt = \Sigma xt + x \times (k/N)$, $\Sigma yt = \Sigma yt + y \times (k/N)$, $\Sigma zt = \Sigma zt + z \times (k/N)$ Step 180:

If the divided number N is smaller than the sample number, processing of step 190 is performed.

Step 190:

Here, a straight line (start point: $x_o$, $y_o$, $z_o$ and direction cosines: l, m, n) is obtained by a method of least square.

$wk = sk \times \Sigma t^2 = (\Sigma t)^2$ $a_x = \{(sk \times \Sigma x - \Sigma x \times \Sigma t)/wk\} * (k/N)$ $a_y = \{(sk \times \Sigma y - \Sigma y \times \Sigma t)/wk\} * (k/N)$ $a_z = \{(sk \times \Sigma z - \Sigma z \times \Sigma t)/wk\} * (k/N)$ $D = \sqrt{a_x^2 + a_y^2 + a_z^2}$ $l = a_x/D, m = a_y/D, n = a_z/D$ $x_0 = x - a_y, y_0 = y - a_y, z_0 = z - a_z$ From the above, the start point of the straight line and the direction cosines can be obtained.

Figure 6:
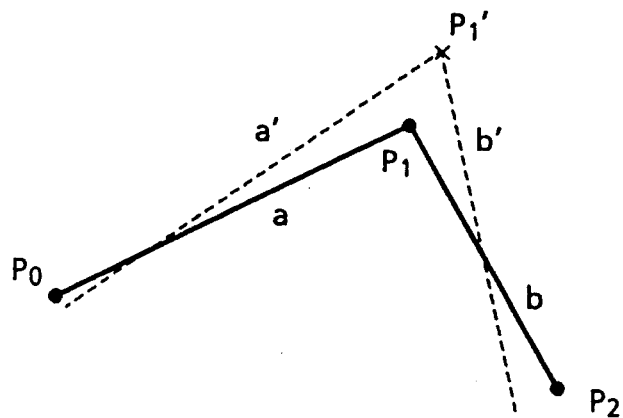
FIG. 6 is an explanatory view of a joint point.

FIG. 5 shows a joint flow between steps. As for the joint flow, as shown in FIG. 6, when points $P_0$, $P_1$, $P_2$ are instructed and straight lines a and b are subjected to sensing operation, actual loci obtained by a method of least squares are a' and b', in which case, it is necessary to obtain an actual point $P_1'$ corresponding to the point $P_1$. This point $P_1$ is called the joint point between steps. A processing for obtaining the joint point is called the joint flow.

Middle points of a common perpendicular line of two straight lines on the space are obtained.

Middle points ($p_x$, $p_y$, $p_z$) of a straight line $L_1$ ($x_1$, $y_1$, $z_1$, $l_1$, $m_1$, $n_1$) and a straight line $L_2$ ($x_2$, $y_2$, $z_2$, $l_2$, $m_2$, $n_2$) are obtained by $\cos\theta = l_1 l_2 + m_1 m_2 + n_1 n_2$ $\sin^2\theta = 1 - \cos^2\theta$ wherein $\theta$ is an angle formed between $L_1$ and $L_2$.

$D_x = x_2 - x_1, D_y = y_2 - y_1, D_z = z_2 - z_1$ $R_1 = l_1 D_x + m_1 D_y + n_1 D_z$ $R_2 = l_2 D_x + m_2 D_y + n_2 D_z$ $S = (R_1 - R_2 \cos\theta)/\sin^2\theta$ $$T = (R_1\cos\theta - R_2)/\sin\theta$$

$P_1$: a point of intersection between the straight line $L_1$ and the common perpendicular line $$P_{1x} = x_1 + S \times l_1$$

$$P_{1y} = y_1 + S \times m_1$$

$$P_{1z} = z_1 + S \times n_1$$

$P_2$: a point of intersection between the straight line $L_2$ and the common perpendicular line $$P_{2x} = x_2 + T \times l_2$$

$$P_{2y} = y_2 + T \times m_2$$

$$P_{2z} = z_2 + T \times n_2$$

Point P $$P_x = (P_{1x} + P_{2x})/2$$

$$P_y = (P_{1y} + P_{2y})/2$$

$$P_z = (P_{1z} + P_{2z})/2$$

Figure 1:
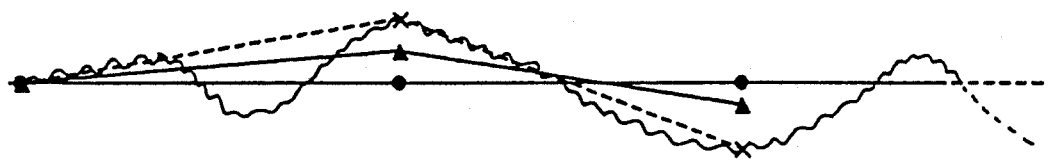
FIG. 1 is an explanatory view showing a deviation between an actual welding path and an instructed path in a conventional method and an actual welding path obtained by a method according to a first embodiment of the invention.
Figure 2:
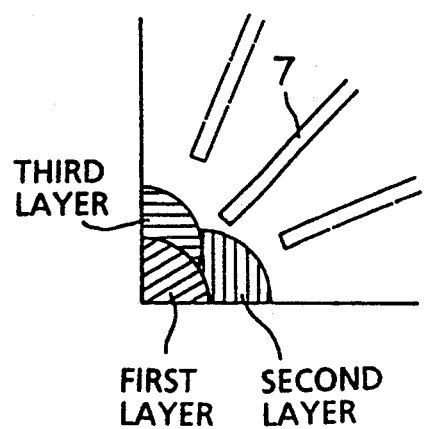
FIG. 2 is an explanatory view of a multi-layer welding.

From the above, a passage point corresponding to each instructed point actually moved is obtained, and the obtained point is shifted and operated to thereby render multi-layer welding possible. FIG. 1 shows comparison between the actual welding path obtained by the above-described method and a conventional method.

As mentioned above, according to the multi-layer welding apparatus of the first embodiment of the invention, in the multi-layer welding having the tracking function in the welding of the first layer, the coordinates in the number of N actually passed by a welding torch at the instructed points in the welding operation of the first layer are stored, approximate straight lines and approximate arcuate lines are calculated by a method of least squares at the instructed points on the basis of the N coordinates, and the instructed points are interpolated by a suitable line with respect to coordinates obtained by adding a predetermined shift amount to said approximate coordinate value to determine a path of welding. Thereby, the actual welding path is obtained even if unstable factors in the tracking function occur, and therefore, calculation can be made on the basis of the actual welding path of the second and succeeding layers to determine a path of welding, thus obtaining excellent welding quality. It is to be noted that the tracking function of the second and succeeding layers is not necessary.

The second embodiment of the invention will be described in detail by way of the illustrations.

Figure 7:
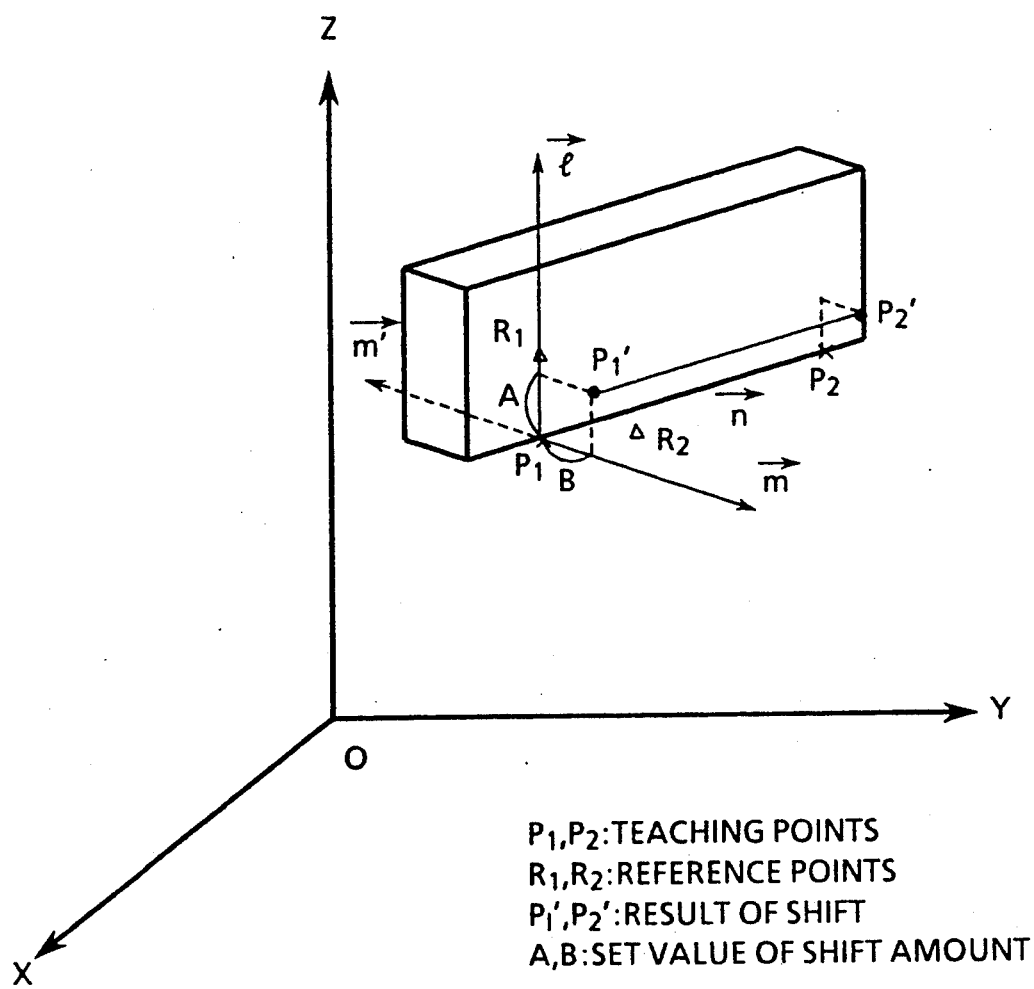
FIG. 7 is an explanatory view showing a method for obtaining the shift direction and the shift amount used as the basis of obtaining the locus of operation of the second and succeeding layers according to a second embodiment of the invention.

In the present invention, the locus of operation of the second and succeeding layers is calculated on the basis of the instructed point of the first layer and the reference point. FIG. 7 is an explanatory view showing the method for obtaining the shift direction and the shift amount which forms the basis of obtaining the locus of operation of the second and succeeding layers according to the present invention.

First, direction cosines $\bar{l}$, $\bar{m}$, and $\bar{n}$ are obtained by the following procedure from point $P_1$ and point $P_2$ instructed as the welding start point and the termination point and reference points $R_1$ and $R_2$ designated to define the shift direction.

i) $\bar{n}$ is obtained from $P_1$ and $P_2$.
ii) $\bar{l}$ is obtained from $P_1$ and $R_1$.
iii) Calculation for obtaining the outer product of $\bar{n}$ and $\bar{l}$ to obtain $\bar{m}$.
iv) Check to see if $R_2$ is which side (right side or left side toward the direction of $\bar{n}$) using as a border a plane formed by $R_1$, $P_1$ and $P_2$, and $\bar{m}$ is directed at the side where $\bar{R}_2$ is present.

Next, the shift amount RA on the robot coordinate is obtained from the shift-amount setting values A and $\bar{l}$. That is, calculation of $RA = A \times \bar{l}$ is performed.

Similarly, the shift amount RB on the robot coordinate is obtained from the shift-amount setting values B and $\bar{m}$. That is, calculation of $RB = B \times \bar{m}$ is performed.

From the above, the shift direction and the shift amount can be obtained to obtain the locus $\overline{P_1' P_2'}$. For the third and succeeding layers, the shift direction and the shift amount can be obtained similarly to obtain the locus of operation.

Figure 8:
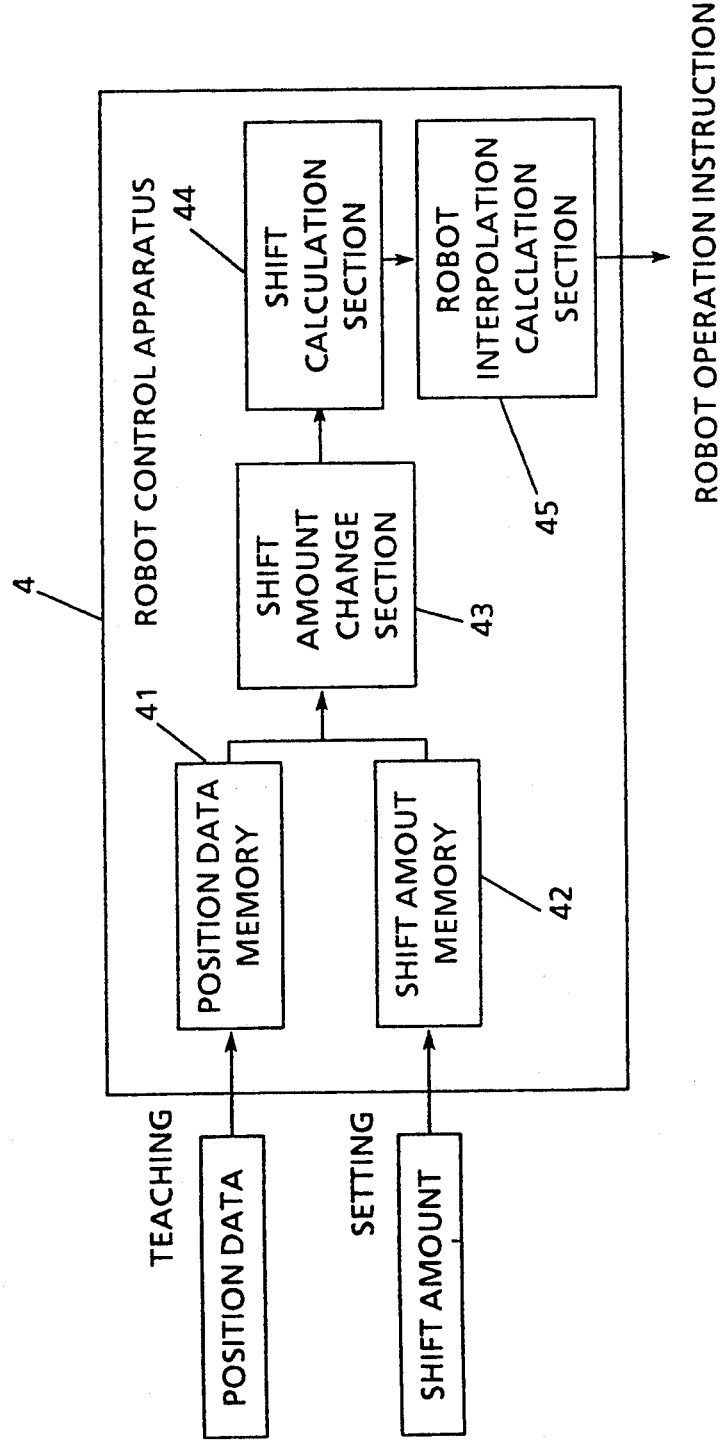
FIG. 8 is a block diagram showing an example of configuration of a robot control device for embodying a welding method according to the invention.
Figure 9:
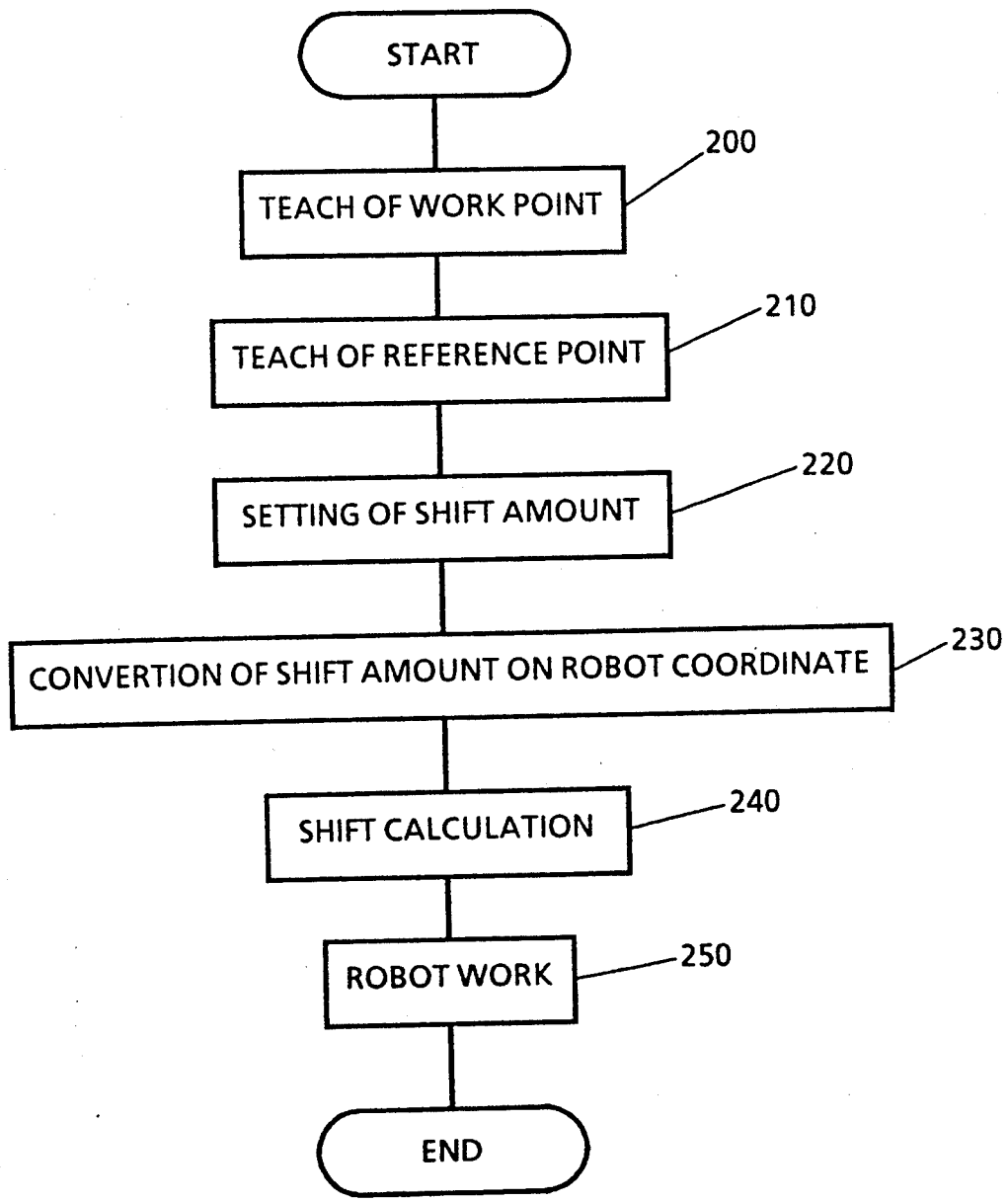
FIG. 9 is a flowchart showing the processing procedure according to the invention.

FIG. 8 is a block diagram showing an example of a configuration of the robot control apparatus for carrying out the method of multi-layer welding according to the present invention, and FIG. 9 is a flowchart showing the processing procedure.

In FIG. 8, reference numeral 4 designates a robot control apparatus, which comprises a position data memory 41, a shift amount memory 42, a shift amount conversion section 43, a shift amount calculation section 44 and a robot interpolation calculation section 45.

The processing by the robot control apparatus 4 shown in FIG. 8 will be described with reference to the flowchart of FIG. 9.

First, a work point and a reference point are instructed to the robot (Steps 200 and 210). The position data obtained by the instruction is stored in the position data memory 41. Then, the shift amount is set to the shift amount memory 42 (Step 220). As the shift amounts, a vertical shift amount and a lateral shift amount are given. Since these position data and shift amounts are given in data in the absolute coordinate system, these data are converted into the shift amounts on the robot coordinate by the shift amount conversion section 43 using the calculation method explained in connection with FIG. 7 (Step 230). Next, the calculation of the shift, that is, the calculation of points of the locus of operation of the layers is carried out, and the calculation result is stored in a memory area separately from the position data memory 41 (Step 240). In the robot interpolation calculation section 45 in FIG. 8, the interpolation calculation carried out on the basis of the obtained start point coordinate and terminal point coordinate, and the robot operation is carried out on the basis of the data as described (Step 250).

As described above, in the second embodiment of the invention, at the time of teaching for the first layer, the reference point is instructed, and the horizontal shift amount and vertical shift amount of the layers are set as parameters to obtain horizontal and vertical cosines which are the shift directions from the start point, terminal point and reference point of teaching and calculate and obtain the locus of operation of the second and succeeding layers from the shift direction and the shift amount. Therefore, merely by instructing the reference point to the first layer and setting the shift amounts of the second and succeeding layers, the thereafter multi-layer welding can be automated to render the operator's operation extremely easy. Further, since the vertical shift is also taken into consideration, a three-dimensional shift can be attained easily.

A third embodiment of the invention will be described in detail by way of an embodiment.

Figure 10:
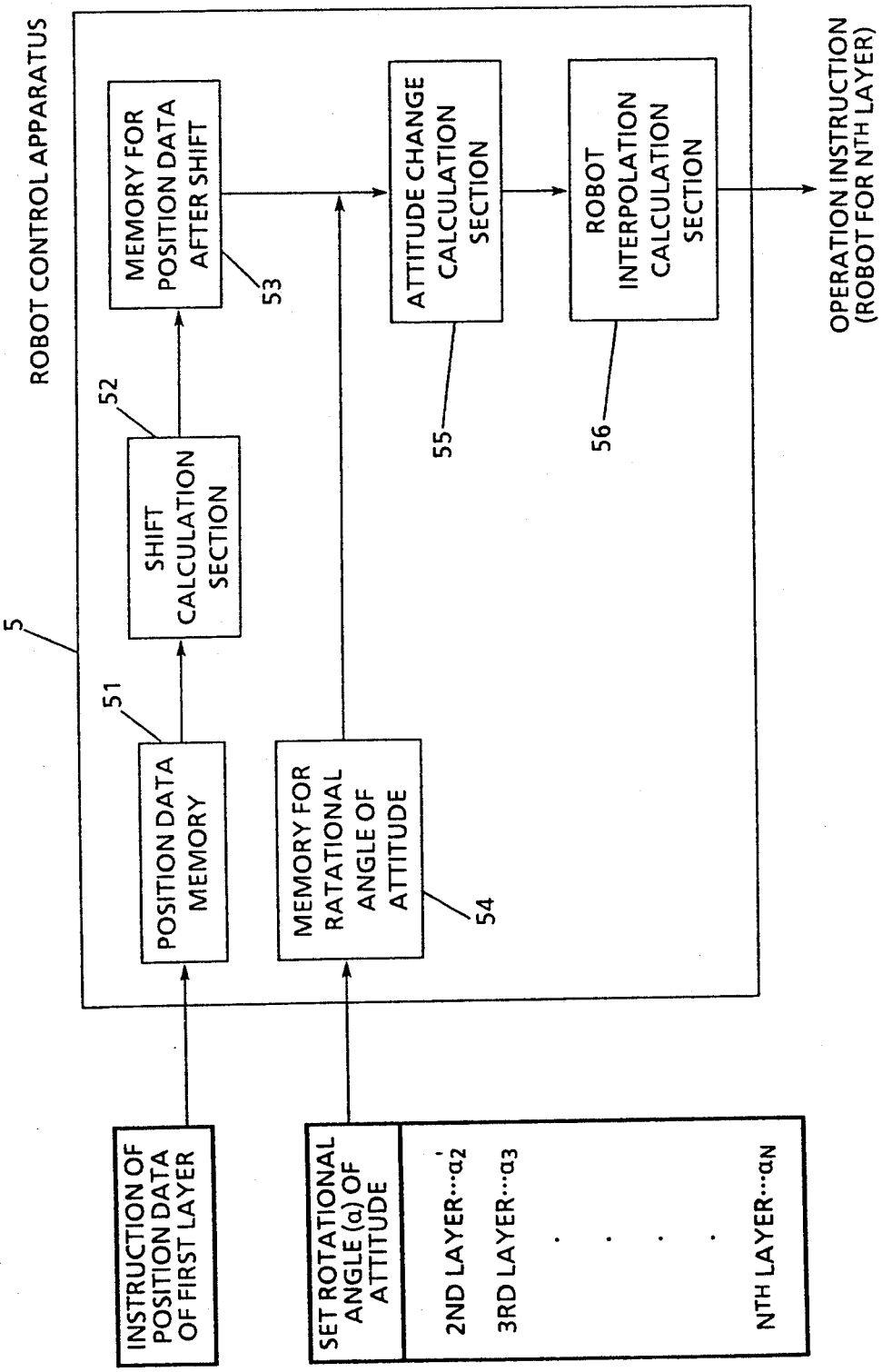
FIG. 10 is a block diagram showing a configuration of an embodiment of a robot control section for embodying a third embodiment of the invention.

FIG. 10 is a block diagram showing a configuration of a robot control section for embodying the third embodiment of the invention.

In FIG. 10, reference numeral 5 designates a robot control apparatus, which comprises a position data memory 51 for storing position data of the first layer instructed, a shift calculation section 52 for calculating points of the locus of operation of the layers, and a memory 53 for storing position data after shifting.

Figure 11:
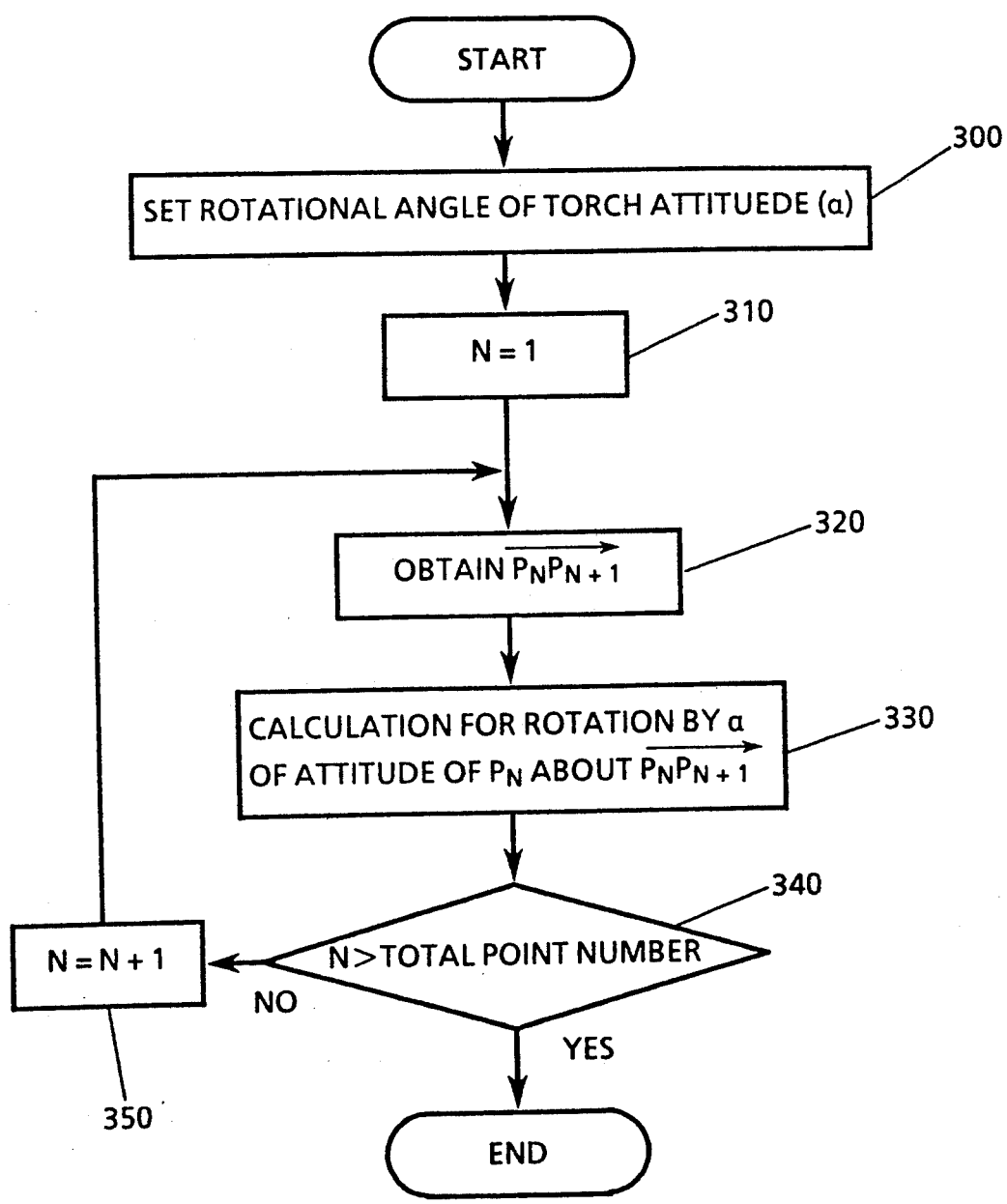
FIG. 11 is a flowchart showing the operating procedure of the same.
Figure 12A:
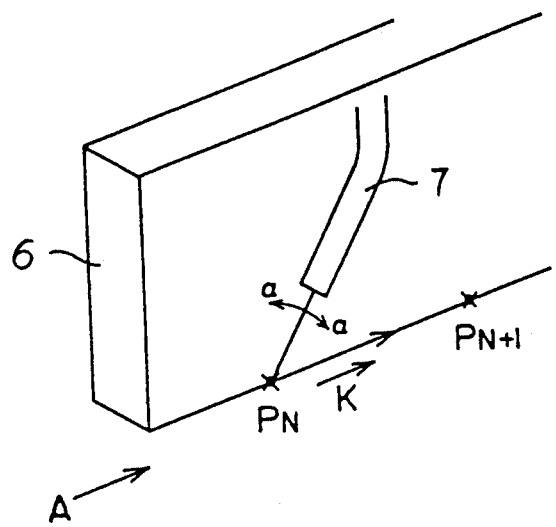
FIGS. 12A and 12B are explanatory views of rotational operation of a welding torch according to the third embodiment of the invention.

The operation procedure in an attitude rotational angle memory 54 and an attitude change calculation section 55 is shown in FIG. 11. That is, in the rotational angle memory 54, rotational angles ($\alpha_1 - \alpha_n$) of the torch attitude from the first to N'th layer set are stored (Steps 300 and 310 of FIG. 11). In the attitude change calculation section 55, a welding line $\overline{P_n P_{n+1}}$ between a welding start point $P_n$ and a terminal point $P_{n+1}$ (see FIG. 12A, in which reference numeral 6 designates a work, and 7 a torch) is obtained (Step 320 in FIG. 11).

Concretely, the following calculation is carried out.

Let $K_x$, $K_y$ and $K_z$ be the direction cosines of $P_n P_{n+1}(=\vec{K})$ the direction cosines thereof are obtained by $K_x$: X component $K_y$: Y component $K_z$: Z component $$\begin{bmatrix} \Delta X \\ \Delta Y \\ \Delta Z \end{bmatrix} = P_{N+1} \begin{bmatrix} X \\ Y \\ Z \end{bmatrix} - P_N \begin{bmatrix} X \\ Y \\ Z \end{bmatrix}$$

$$L = \sqrt{\Delta X^2 + \Delta Y^2 + \Delta Z^2}$$

$$K_x = \Delta X / L$$

$$K_y = \Delta Y / L$$

$$K_z = \Delta Z / L$$

Figure 12B:
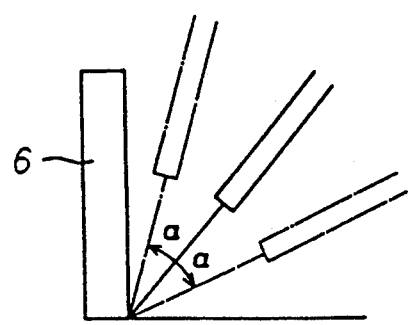

Next, the attitude change calculation section 56 performs calculation in which the attitude of $P_n$ is rotated by ($\alpha_1 - \alpha_n$) around $\overline{P_n P_{n+1}}$, as shown in Step 330 of FIG. 11 and FIG. 12B.

Concretely, the following calculation is carried out.

The attitude of the robot at the position of $P_n$ can be expressed by a matrix of three lines and three rows:

$$T = \begin{bmatrix} B_x & O_x & A_x \\ B_y & O_y & A_y \\ B_z & O_z & A_z \end{bmatrix}$$

Next, the rotation (general rotation conversion) of suitable vector ($\vec{K}$) can be expressed by $$\text{Rot}(K, \alpha) = \begin{bmatrix} K_x \cdot K_x \cdot v\alpha + c\alpha & K_y \cdot K_x \cdot v\alpha - K_z \cdot s\alpha & K_z \cdot K_x \cdot v\alpha + K_y \cdot s\alpha \\ K_x \cdot K_y \cdot v\alpha + K_z \cdot s\alpha & K_y \cdot K_y \cdot v\alpha - c\alpha & K_z \cdot K_y \cdot v\alpha - K_x \cdot s\alpha \\ K_x \cdot K_x \cdot v\alpha - K_y \cdot s\alpha & K_y \cdot K_x \cdot v\alpha + K_x \cdot s\alpha & K_z \cdot K_z \cdot v + c\alpha \end{bmatrix}$$

where sin $\alpha$ is $s\alpha$ and cos $\alpha$ is $c\alpha$, and (1 − cos$\alpha$) is $v\alpha$.

Accordingly, the attitude T' to be obtained is obtained by $$T' = \text{Rot}(k, \alpha) \cdot T.$$

The above-described processing is carried out till N reaches total point numbers (Steps 340 and 350 in FIG. 11).

The robot interpolation calculation section 56 in FIG. 10 performs a predetermined interpolation calculation, which is outputted as the operation instruction to the robot.

As described above, according to the third invention, in the method of multi-layer welding, the locus of operation of the first layer is stored and the rotational angle of torch is given as a parameter from the outside. After the locus of operation of the second and succeeding layers has been obtained, the torch is rotated by the rotational angle of torch about the progressing vector obtained at the instructed point to calculate and obtain the attitude data. Therefore, the change of attitude of the multi-layer welding can be automated merely by putting the rotational angle of torch, rendering the operator's operation extremely easy.

INDUSTRIAL APPLICABILITY

The present invention can be utilized in the field in which a thick plate or the like is subjected to multi-layer welding using a welding robot.

We claim:

1. A multi-layer welding method for multi-layer welding according to a path of welding defined by interpolating a plurality of instructed points by a suitable line, the method comprising the steps of:
   passing a welding torch in a welding operation;
   storing N coordinates actually passed by said welding torch in the welding operation of a first layer at the instructed points,
   calculating and storing approximate straight lines and approximate curves using the method of least squares at the instructed points on the basis of said stored N coordinates at the instructed points;
   calculating points on each of the approximate straight line or approximate curves on the basis of the distance of the instructed points to define each actual welding path by said points and
   welding a second layer in accordance with a path defined by said calculated points.

2. A multi-layer welding apparatus for multi-layer welding according to a path of welding defined by interpolating a plurality of instructed points by a suitable line, the apparatus comprising:
  means for pass a welding torch, in a welding operation;
  first means for storing N coordinates actually passed by said welding torch in the welding operation of a first layer at the instructed points,
  second means for calculating and storing approximate straight lines and approximate curves using the method of least squares at the instructed points on the basis of said stored N coordinates at the instructed points stored by said first means,
  third means for determining a welding path by interpolation by a suitable line with respect to coordinates obtained by adding predetermined shift amounts to approximate coordinates stored by said second means at the instructed point at the time of welding the second and succeeding layers and
  means for controlling said welding torch passing means for welding a second layer in accordance with said determined welding path.

* * * * *